US012762714B2

(12) United States Patent
He et al.

(10) Patent No.: US 12,762,714 B2
(45) Date of Patent: Oct. 13, 2026

(54) FAST AND ROBUST QUANTIFICATION METHOD TO MEASURE GLASS LIQUID FLOW SPEED (VISCOSITY) USING LOW SIGNAL-TO-NOISE VIDEOS

(71) Applicant: CORNING INCORPORATED, Corning, NY (US)

(72) Inventors: Jingxi He, Elmira, NY (US); Ming Yang, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 202 days.

(21) Appl. No.: 18/888,313

(22) Filed: Sep. 18, 2024

(65) Prior Publication Data

US 2025/0095164 A1 Mar. 20, 2025

Related U.S. Application Data

(60) Provisional application No. 63/539,366, filed on Sep. 20, 2023.

(51) Int. Cl.
*G06T 7/20* (2017.01)
*G06T 5/40* (2006.01)
(Continued)

(52) U.S. Cl.
CPC .................. *G06T 7/20* (2013.01); *G06T 5/40* (2013.01); *G06T 5/70* (2024.01); *G06T 5/73* (2024.01);
(Continued)

(58) Field of Classification Search
None
See application file for complete search history.

(56) References Cited

U.S. PATENT DOCUMENTS

| | | | |
|---|---|---|---|
| 8,594,431 B2 | 11/2013 | Ben-Horesh et al. | |
| 2021/0131959 A1 | 5/2021 | Andrews et al. | |

(Continued)

FOREIGN PATENT DOCUMENTS

| | | | | |
|---|---|---|---|---|
| CN | 116245040 A * | 6/2023 | ............ | G06F 30/28 |
| WO | 2021/086766 A2 | 5/2021 | | |

OTHER PUBLICATIONS

Analysis of Liquid Viscosity by Image Processing Techniques, by K. V. Santhosh et al., Indian Journal of Science and Technology, vol. 9(30), DOI: 10.17485/ijst/2016/v9i30/98693, Aug. 2016 (Year: 2016).*

(Continued)

*Primary Examiner* — Vikkram Bali
(74) *Attorney, Agent, or Firm* — Svetlana Z. Short

(57) ABSTRACT

Various embodiments disclosed relate to a method and system for quantifying the flow speed of glass liquid from digital video data. The present disclosure includes capturing images from a video, cropping an area from each image, and concatenating the area from each image into a single image. Additionally, the disclosure includes preprocessing the single image, performing template matching on the preprocessed single image, determining boundary indexes, and cropping a region from the preprocessed single image based on the boundary indexes. The disclosure also includes calculating gradients in the cropped region, identifying a pixel with a maximum gradient, determining an average row index for columns with multiple pixels, performing iterative linear regression on row and column indexes to find a line crossing all the maximum gradient pixels with the least error, and quantifying a flow speed of glass liquid based on a final slope of the line.

20 Claims, 7 Drawing Sheets

(51) Int. Cl.
*G06T 5/70* (2024.01)
*G06T 5/73* (2024.01)
*G06T 7/00* (2017.01)
*G06V 10/25* (2022.01)
*G06V 10/75* (2022.01)

(52) U.S. Cl.
CPC ............ *G06T 7/0002* (2013.01); *G06V 10/25* (2022.01); *G06V 10/751* (2022.01); *G06T 2207/20132* (2013.01)

(56) References Cited

U.S. PATENT DOCUMENTS

| | | | | |
|---|---|---|---|---|
| 2026/0007309 | A1* | 1/2026 | Dave | A61B 1/00103 |
| 2026/0061699 | A1* | 3/2026 | Crane | B29C 64/153 |

OTHER PUBLICATIONS

Translation for CN 116245040 A.*
Nobuyuki Otsu, "A threshold selection method from graylevel histograms". IEEE Transactions on Systems, Man, and Cybernetics. 9 (1), 1979, pp. 62-66.

* cited by examiner

FAST AND ROBUST QUANTIFICATION METHOD TO MEASURE GLASS LIQUID FLOW SPEED (VISCOSITY) USING LOW SIGNAL-TO-NOISE VIDEOS

CROSS-REFERENCE TO RELATED APPLICATIONS

This application claims the benefit of priority to U.S. Provisional Patent Application No. 63/539,366 filed on Sep. 20, 2023, the content of which is incorporated herein by reference in its entirety for all purposes.

TECHNICAL FIELD

The present disclosure relates to a method and system for measuring the flow speed of glass liquid, and more particularly, but not by way of limitation, to a method and system for measuring viscosity using low signal-to-noise video footage.

BACKGROUND

In high throughput material screening experiments, identifying the speed at which glass liquid flows is an efficient method to estimate viscosity for selecting the appropriate material type. Typically, a higher flow speed represents lower viscosity. However, the quality of the video recordings of experiments for determining flow speed may change significantly. This could be due to the use of low-cost vision systems or because of the non-standard lab environment. Time efficiency is also very important to the screening process. A fast and robust measurement of glass flow using video recordings allows one to efficiently narrow down the type of material to be used. Using classical video and image processing techniques has presented many difficulties in distinguishing glass liquid as there is both useful and noisy information in the videos. Therefore, developing a robust method to process the videos and quantify the speed at which the glass liquid flows is a necessity.

SUMMARY

This document describes, among other things, a method and system for automatically cropping an area of interest from an image and quantifying the liquid flow speed under various video quality conditions. Videos recorded in lab environment settings tend to have unstable quality making it challenging to process the videos and obtain reliable results. Traditional advanced video and image processing algorithms tend to fail in low signal-to-noise ratio videos due to their sensitivity to noise. However, the method and system described in this document generate accurate results without complex computation, requiring substantially no human interaction. In general, the system and method are especially productive in scenarios where a large volume of low signal-to-noise videos need to be analyzed and compared automatically.

The system and method first capture images from a video and crop the glass liquid portions within the images. The cropped areas are then concatenated consecutively before denoising and binarization. The machine learning method is an iterative linear regression model that is applied to the pixel row and column indexes on the derivative image with noise removed in each iteration until the pre-defined conditions are met. After, a concatenated image is generated and compared with a user-defined template and a selected number to identify the closest matching location. This selected number can be adjusted based on different user application scenarios. Based on the indexes of the locations, the image area containing the most relevant signal is cropped from the concatenated image. After retrieving the desired image portion which represents the liquid flow speed, the column-wise gray intensity gradients representing the rate of gray level intensity change are calculated. One goal of this process is to find a line with the least error across all pixels where the largest gradients occur over all columns. This is useful because the slope of the line represents the liquid flow speed or viscosity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Videos recorded in laboratory environments tend to be unstable in quality making it challenging to process the videos and obtain reliable results. Traditional advanced video and image processing algorithms, being sensitive to noise, tend to fail in low signal-to-noise ratio videos.

This disclosure describes, among other things, a system and method which automatically crops an image portion that contains a useful signal (e.g., the glass liquid area of an image which is visible) and quantifies the liquid flow speed under various video quality conditions. The system and method generate accurate results without complex computation, requiring substantially no human interaction. Additionally, the system and method are especially productive in automatically analyzing and comparing large volumes of low signal-to-noise videos.

Figure 1A:
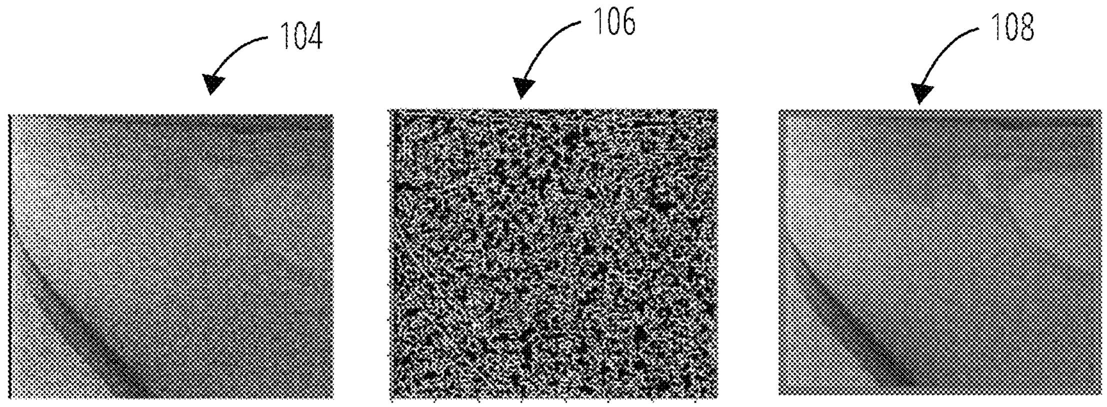
FIG. 1A illustrates an example of edge and contour detection results of a noisy image according to an embodiment.

FIG. 1A illustrates an example of edge and contour detection results of a noisy image according to an embodiment. In the high throughput material screening experiment, identifying the glass liquid flow speed is an efficient method to select the material type with appropriate viscosity. Typically, a higher flow speed represents lower viscosity. As mentioned, videos recorded in lab environments tend to have unstable quality making it challenging to process the videos and even more challenging to obtain reliable results. The instability of the video quality speaks to the noisiness of the video. Video quality which is more unstable results in a noisier video and thus, noisier images. Further, time efficiency is also very important to the screening process.

Figure 1B:
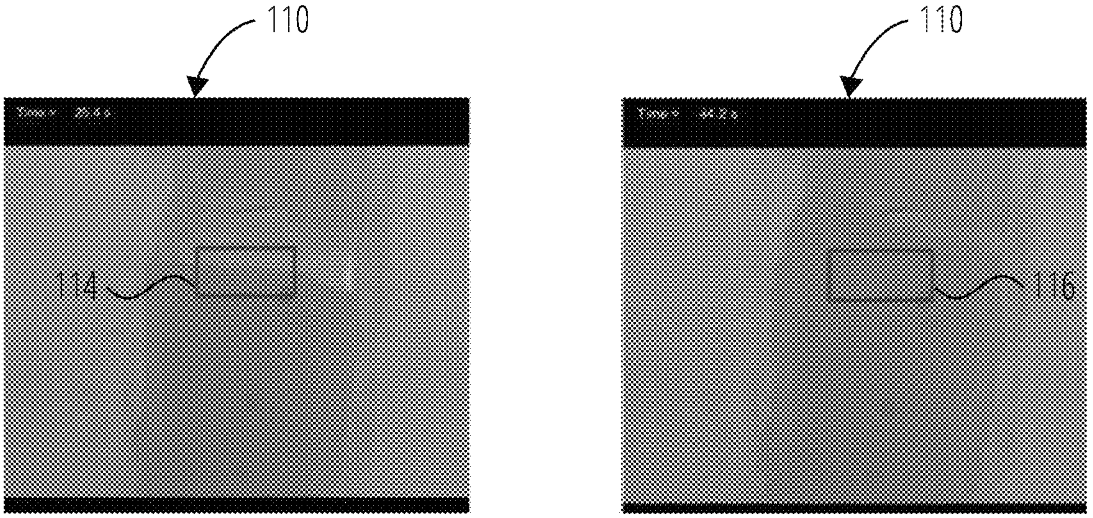
FIG. 1B illustrates an example of the mean shift object tracking results of a noisy video according to an embodiment.

The traditional advanced video and image processing algorithms fail in low signal-to-noise ratio videos due to their sensitivity to noise, as shown in FIG. 1A and FIG. 1B. FIG. 1A is an example of the edge and contour detection results of a noisy image. Example image 104 is a depiction of a cropped portion from a noisy image. Using this cropped portion, the liquid flow speed can be detected under various video quality conditions. Example image 104 is then processed and the canny edge detection results 106 are shown in the second image. The Canny edge detector is an edge detection operator that uses a multi-stage algorithm to detect a wide range of edges in images. The contour detection results 108 however, fail in low signal-to-noise ratio videos due to noise sensitivity, as shown in the third image.

FIG. 1B illustrates an example of the mean shift object tracking results of a noisy video according to an embodiment. Similar to the example image 104 of FIG. 1A, example video 110 of FIG. 1B depicts unstable video quality resulting in a noisier video and thus, noisier images. Example video 110 of FIG. 1B, also similar to the example image 104 of FIG. 1A fails in low signal-to-noise ratio videos due to noise sensitivity. Obtaining reliable results in an efficient time is also very important to the screening process. As depicted in the first screen capture of example video 110, the object tracking starting point 114 is shown with a time stamp of 25.4 seconds. Object tracking result 116, depicted in the second image, captures example video 110 with a time stamp at 44.2 seconds. The noisiness of example video 110 and its captured images cause the low signal-to-noise ratio to fail and also causes delayed timing in results.

A fast and robust glass flowing measurement using videos allows efficient narrowing down of the types of material. The classical video and image processing techniques, as shown in FIG. 1A and FIG. 1B, were first employed. However, the traditional algorithms had difficulty distinguishing the glass liquid front, or the glass liquid area of a video or image, as they contain both useful and noisy information in the videos and images. Therefore, developing a robust method, as depicted in FIG. 2 to process the experiment videos and to quantify the glass liquid flow speed is ideal.

Figure 2:
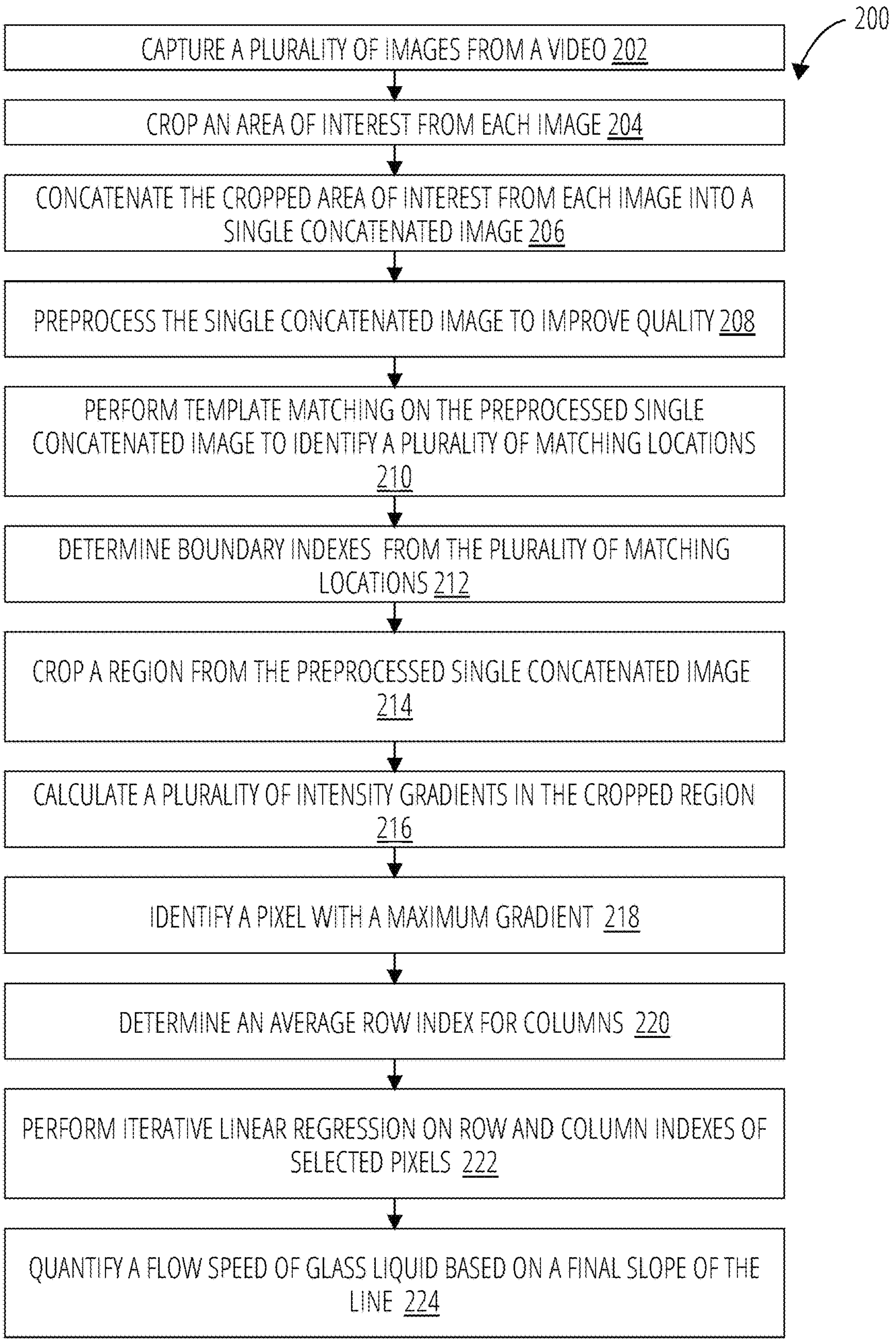
FIG. 2 illustrates a flowchart of an example of a method of quantifying a flow speed of glass liquid according to an embodiment.

FIG. 2 illustrates a flowchart of an example of a method 200 of quantifying a flow speed of glass liquid according to an embodiment. FIG. 2 illustrates generally an example method 200 which automatically crops the image portion containing the useful signal (e.g., the glass liquid area of an image which is visible) and quantifies the liquid flow speed under various video quality conditions. The method 200 may generate accurate results without complex computation and without the need for human interference. In general, the method 200 may be especially productive in scenarios where large volumes of low signal-to-noise videos need to be analyzed and compared automatically.

In an example, method 200 may include operation 202 which captures a plurality of images from a video. The images may be captured from the video as one frame every N seconds, wherein N may be 0.1 or 1,2 etc. The plurality of images may also be a predefined set number of images. The images may be captured by way of exportation, screen capture, extraction, or any other method used to capture images from a video. Method 200 may further include converting the images to a reasonable size which makes the image easier to view.

At operation 204, method 200 may also include cropping an area of interest from each of the plurality of images. This cropping may be done automatically or manually, though automatic cropping is preferred. Operation 204 crops a portion of the image which contains a useful signal or image clarity. This useful signal may be the glass liquid area of the image which is visible, thus cropping the image portion containing the most relevant signal. Other forms of material may also be measured, for example, plastic. The area to be analyzed may be cropped out as the area of interest from each image. The cropped region may contain a border similar to that of a square, rectangle, or any other shape and though ideally red in color, may be of any color which provides easy viewing of the area of interest. Examples of this method of cropping are shown in the cropped area of interest 306 in FIG. 3 and FIG. 5.

At operation 206, method 200 may concatenate the cropped area of interest from each of the plurality of images into a single concatenated image. After cropping the image, a method to quantify the slope of the transition line in the concatenated image may be implemented. The cropped areas of interest from each image may be concatenated consecutively, for example. The concatenation process may be designed to link the areas of interest together into a series or chain to clarify the image.

At operation 208, method 200 may preprocess the single concatenated image to improve image quality. Preprocessing may include using some typical image processing methods to improve the image's quality. The sequential processing techniques may include for example, sharpening the edges with a filter. Sharpening filters enhance the contrast between neighboring pixels, making the edges and details more visible and defined. Sharpening filters may also reduce the effects of noise, blur, or compression artifacts that degrade the quality of images. Preprocessing examples may also include adjusting contrast with Histogram Equalization and segmenting the image with K-means. Histogram Equalization is a computer image processing technique used to improve contrast in images. It accomplishes this by effectively spreading out the most frequent intensity values, e.g., stretching out the intensity range of the image. K-means calculates the distances to assign a point to a cluster. The main objective of the K-Means algorithm is to minimize the sum of distances between the points and their respective cluster centroid.

In another example, preprocessing may include thresholding the image with Otsu's method. Otsu's method looks at every possible value for the threshold between background and foreground, calculates the variance within each of the two clusters, and selects the value for which the weighted sum of these variances is the least, as noted in the manuscript proposed Otsu's method: Nobuyuki Otsu (1979). "*A threshold selection method from gray-level histograms*". IEEE Transactions on Systems, Man, and Cybernetics. 9 (1): 62-66. Other methods of preprocessing such as histogram shape-based or clustering-based image thresholding may also be implemented and eventually, a binary concatenation image is obtained.

Figure 4:
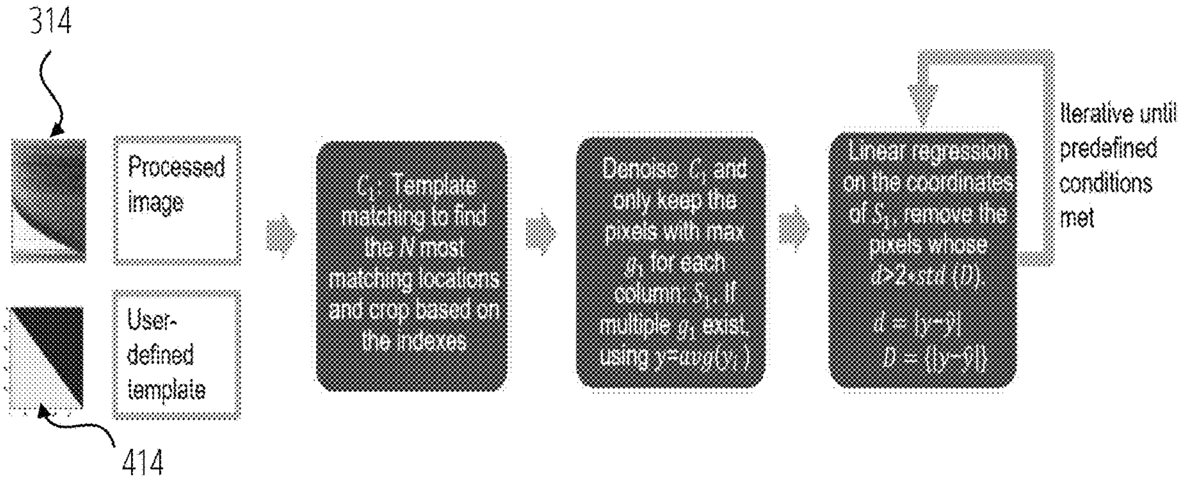
FIG. 4 illustrates an example of another step diagram according to an embodiment.

At operation 210, method 200 may perform template matching on the preprocessed single concatenated image using a user-defined template to identify a plurality of matching locations. An example of this operation is shown in FIG. 4 at 414. In some examples, the user-defined template comprises a line, wherein the line indicates a glass liquid region. In other examples, the liquid front is known to be an approximate diagonal line. The liquid front including the glass liquid area of an image or video. By way of example, a diagonal line template with the size of (100×100) is generated and engaged. After searching in the binary concatenation image using the template, N most matching portions are recognized. N may be 1000 or 2000, 5000 etc. Then, the smallest and the largest row indexes for example, and the largest column index may be selected and set as the cropping indexes. Now, the image portion containing the most relevant signal may be identified and cropped.

At operation 212, method 200 may determine boundary indexes from the plurality of matching locations. Determining boundary indexes may comprise for example, determining a smallest row index, a largest row index, and a largest column index of a plurality of matching locations.

In operation 214, method 200 crops a region from the preprocessed single concatenated image based on the boundary indexes, the cropped region containing a useful signal (e.g., the glass liquid area of an image which is visible). The main objective is to automatically crop the portions containing the most relevant signal from each binary image. As mentioned, the slope of the image determines the flow speed of the video. The cropped area of interest may be shown in varying shapes including circle, square, rectangle, etc.

At operation 216, the method 200 may calculate a plurality of intensity gradients in the cropped region. The intensity gradients representing the rate of gray level intensity change. In operation 218, method 200 identifies a pixel with a maximum gradient for a plurality of column indexes. Operation 220 determines an average row index for columns with multiple pixels having the maximum gradient. In operation 222, method 200 performs iterative linear regression on row and column indexes of selected pixels to determine a slope of a line fitting the selected pixels.

After cropping the image, the slope of the transition line in the concatenated image is quantified. Example methods may including calculating the column-wise intensity gradients. The column-wise gray intensity gradients representing the rate of gray level intensity change. For each column, the pixel with the largest intensity gradient may be identified. Row index may also be obtained during this process. For the column with multiple maximum gradient pixels, the average row index is used. Then, a linear regression model may be applied on the pixels' row index and column index. The absolute distance between each employed pixel and the regression line may be calculated and the outliers, for example, the pixels whose absolute distance are larger than two standard deviations are removed. The linear regression is applied on the remaining pixels iteratively. The iterative regression with noise removing process stops when the pre-defined condition is met.

Figure 6A:
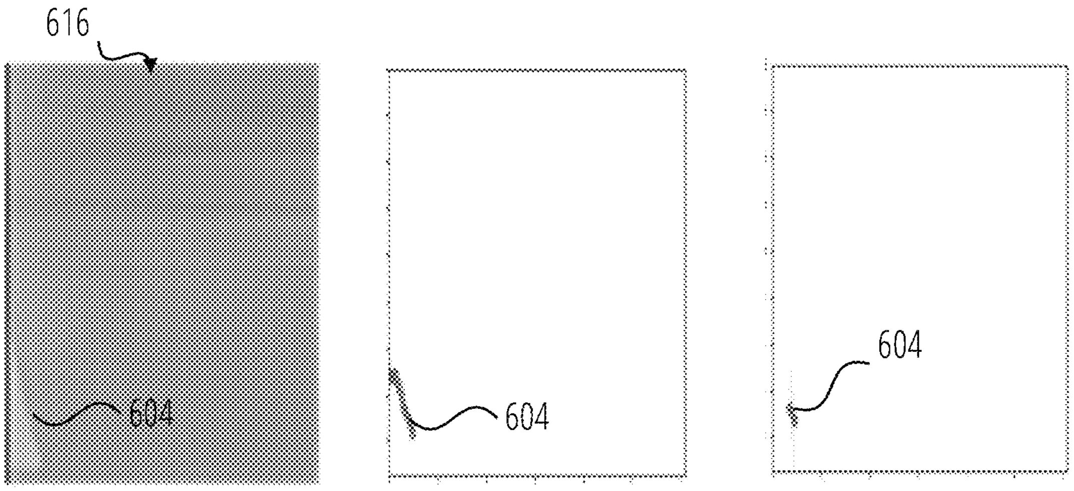
FIG. 6A illustrates example iterative linear regression results according to an embodiment.
Figure 6B:
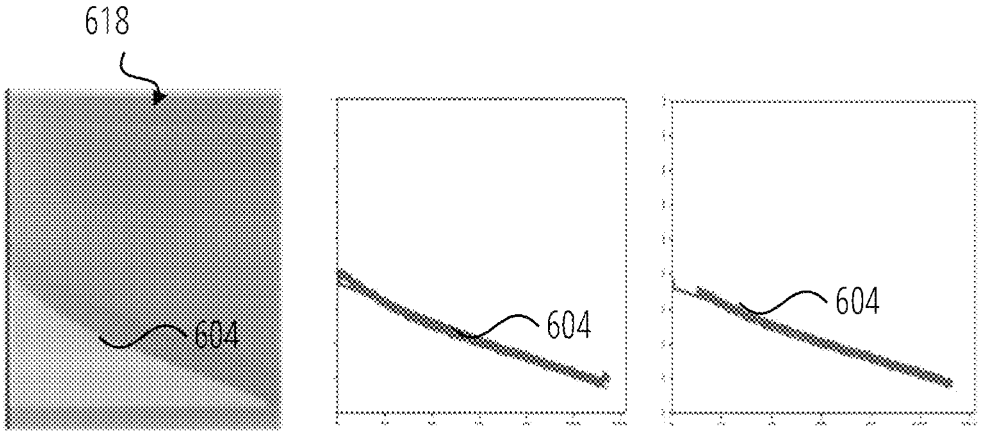
FIG. 6B illustrates another example iterative linear regression result according to an embodiment.

In operation 224, method 200 quantifies a flow speed of glass liquid based on a final slope of the line after substantial convergence of the iterative linear regression. In some examples, after six iterations, the regression coefficient converged to 3.00. This example is depicted in FIG. 6A. FIG. 6B represents an example in which a clean image carries relatively large parts of useful signal. This useful signal may be the glass liquid area of the image which is visible, thus cropping the image portion containing the most relevant signal. The regression coefficient converged to 0.52 after two iterations in this example.

Figure 7A:
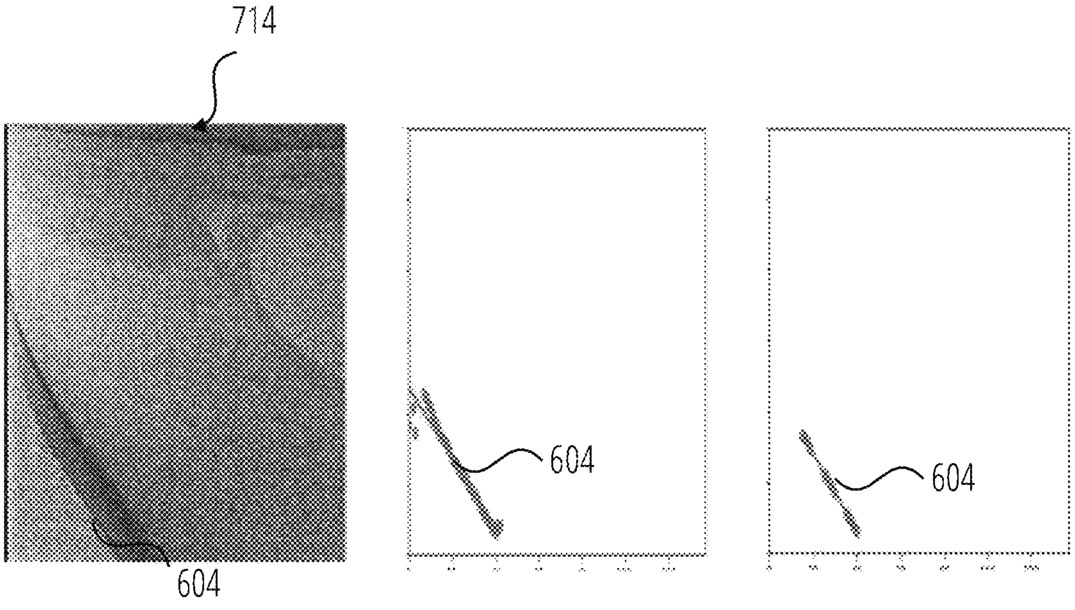
FIG. 7A illustrates yet another example iterative linear regression results according to an embodiment.
Figure 7B:
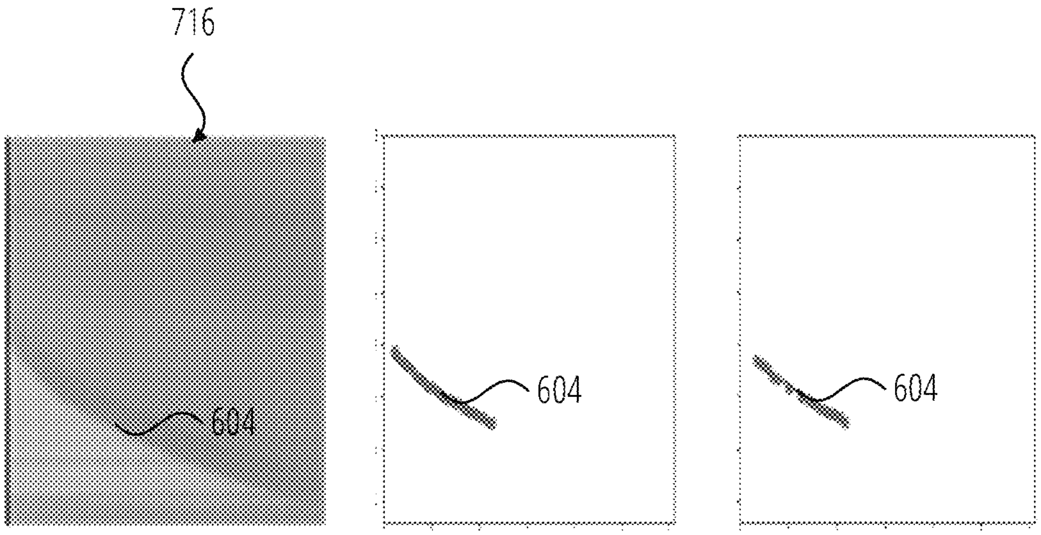
FIG. 7B illustrates an example iterative linear regression result according to an embodiment.

An example of a heavy noisy image with the regression coefficient at 1.10 after five iterations is represented in FIG. 7A. FIG. 7B represents an example image having relatively high signal-to-noise ratio, but some noise exists. The regression coefficient was 0.82 after two iterations in this example. Moreover, the overall processing time for one video was less than two minutes considering the longest video recording length was three minutes in this example.

Figure 3:
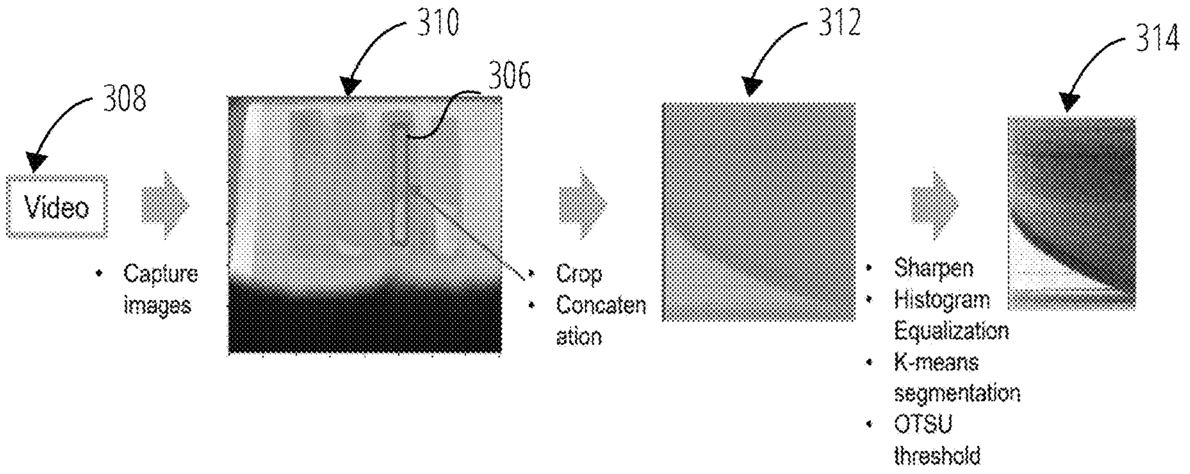
FIG. 3 illustrates an example step diagram of image preprocessing according to an embodiment.

FIG. 3 illustrates an example step diagram of image preprocessing according to an embodiment. In this example, a video 308 or several videos are taken, and one or more images are captured from the video 308, such as image one from video 310. The cropped area of interest 306 may then be identified from each of the plurality of images. This example highlights the cropped area of interest 306 depicted by a red rectangular box. Though this region may be depicted as a rectangular box, the cropped area of interest 306 may be shown in varying shapes including circle, square, etc. Once the cropped area of interest 306 is identified from each image, the concatenation process may take place. The cropped area of interest from each of the plurality of images is concatenated into a single preprocessed concatenated image 312 to improve the quality of the image as shown in FIG. 3.

After concatenation, the preprocessed concatenated image 312 may go through several processing techniques include for example, sharpening the edges, adjusting contrast with Histogram Equalization, segmenting the image with K-means, and thresholding the image with Otsu's method. Eventually, a binary concatenation image, or processed image 314 as shown in the third image of FIG. 3 is obtained. This image is now sharper and provides easier viewing of the liquid flow.

FIG. 4 illustrates an example of another step diagram according to an embodiment. Generally, the coefficient of a final regression model reflects the glass liquid flow speed in the video. This final regression coefficient is typically a reflection of the slope of the line. The step diagram of the framework is presented in FIG. 4 which depicts image processing, cropping, and liquid front quantification. The main objective of the image processing step, as shown in example FIG. 4, is to capture the useful signal (e.g., the glass liquid area of an image which is visible) and convert the signal to an image with a reasonable size. The images may be captured from a video as one frame every N seconds. N may be 0.1 or 0.2 or 1,2 etc. In an example, the area of interest, or area to be analyzed is cropped out from each image.

Figure 5:
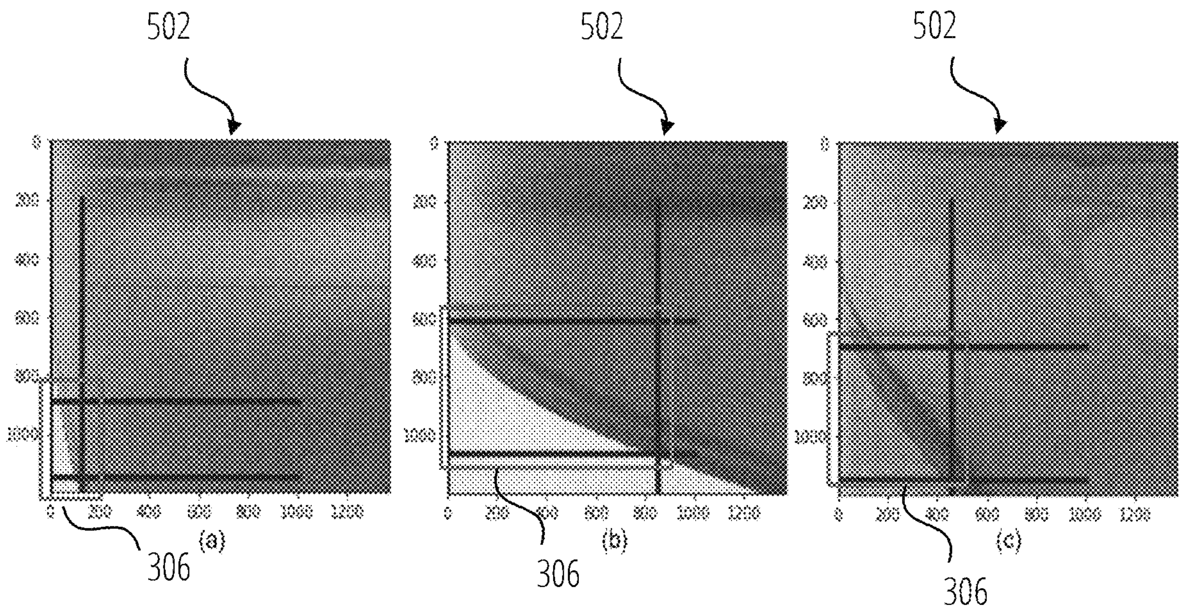
FIG. 5 illustrates example results under various conditions according to an embodiment.

In an example, the column-wise middle point of the liquid container may be cropped as shown in the red square cropped area of interest 306 of FIG. 5. Next, the cropped area of interest 306 from each image may be concatenated consecutively. Last, the preprocessed concatenated image 312 may be processed using some typical image processing methods to improve the quality. Example sequential processing techniques may include sharpening the edges with a filter, adjusting contrast with Histogram Equalization, segmenting the image with K-means, and thresholding the image with Otsu's method. Eventually, a binary concatenation image is obtained.

The main objective of the image cropping step is to automatically crop the portions containing the most relevant signal from each binary image. As mentioned, the slope of the preprocessed concatenated image 312 determines the flow speed of the video. It would mislead the quantifying results to include the unrelated pixels in the process to find the line via a regression model. Thus, a user-defined user defined template 414 matching is employed to identify the cropping indexes.

In some examples, the liquid front is known to be an approximate diagonal line. The liquid front including the glass liquid area of an image or video. Therefore, a diagonal line template is generated and engaged. After searching in the binary concatenation image using the template, the most matching portion may be recognized. Then, the smallest and the largest row indexes, and the largest column index may be selected and set as the cropping indexes. Now, the image portion containing the most relevant signal may be identified and cropped. Examples of this cropping process are illustrated in FIG. 5.

After getting the cropped image, a method to quantify the slope of the transition line in the concatenated image may be implemented. In this liquid front quantification step, the column-wise intensity gradients may be calculated. The column-wise intensity gradients representing the rate of gray level intensity change. For each column, the pixel with the largest intensity gradient may be identified and the row index may be obtained. For the column with multiple maximum gradient pixels, the average row index may be used. Then, our goal is to find a line crossing all the maximum gradient pixels with the least error. in an example, a linear regression model may be applied on the pixels' row index (yy) and column index (xx) as in Eq. 1 below.

$$y_i = \alpha x_i + \varepsilon_i,\ i = 1, 2, \ldots, n \quad \text{(Eq. 1)}$$

Next, the absolute distance dd between each employed pixel and the regression line may be calculated. And the outliers, i.e., the pixels whose dd are larger than two standard deviations of DD, may be removed. The linear regression may be applied on the remaining pixels iteratively. The iterative regression with noise removing process may stop when the pre-defined conditions are met. This is reflected in Eq. 2 and Eq. 3 below.

$$d_i = |y_i - \hat{y}_i| \quad \text{(Eq. 2)}$$

$$D = \{d_1, d_2, \ldots, d_n\} \quad \text{(Eq. 3)}$$

In an example, the stopping criteria is the coefficients' absolute difference between two consecutive iterations less than 0.05. The coefficient aa of the final regression model may represent the slope of the line in the image, which is the glass liquid flow speed/viscosity of the glass in the video. Several example experiment videos with a variety of different image quality were utilized to verify the results of the proposed method. The results confirm that the method can efficiently identify and quantify the glass liquid front under various video quality conditions as shown in FIG. 6A-FIG. 7B. The liquid front including the glass liquid area of an image or video FIG. 5 illustrates example results under various conditions according to an embodiment. This figure provides several examples of image cropping on the image from video 502. This part of the process is necessary as the slope of the concatenated image determines the flow speed in the video. Mistakenly including the unrelated pixels in the process to find the line via a regression model would mislead the quantifying results. The main objective of FIG. 5 therefore, is to provide examples of automatic cropping of areas of interest, or parts containing the most relevant signals from each image.

As shown in FIG. 5, there are three different variations of the image from video 502. The first image from video 502 depicts an example of a small portion of useful information within the cropped area of interest 306. The second image from video 502 depicts an example of a large portion of useful information within the cropped area of interest 306. The third image from video 502 depicts an example of useful information within the cropped area of interest 306 but also containing noise.

To identify the cropping indexes, a user-defined template matching may be employed. In example FIG. 5, the liquid front is known to be an approximate diagonal line. The liquid front including the glass liquid area of an image or vide. Therefore, a diagonal line template with the size of 100×100, for example, is generated and engaged. After searching in the binary concatenation image using the template, the N most matching portion may be recognized. In other examples, N could be 1000 or 2000, 5000 etc. In examples, the smallest and the largest row indexes, and the largest column index may be selected and set as the cropping indexes. Finally, the image portion containing the most relevant signal may be identified and cropped. Three cropping examples 502 are illustrated in FIG. 5.

FIG. 6A illustrates example iterative linear regression results according to an embodiment. Iterative linear regression is applied on pixel row and column indexes on the derivative images with noise removed in each iteration until the pre-defined conditions are met. The coefficient of the final regression model (the slope of the line) reflects the glass liquid flow speed in the video. FIG. 6A, FIG. 6B, FIG. 7A, and FIG. 7B were derived from a variety of experimental videos resulting in a variety of images with varying qualities. These varying images and qualities were utilized to verify examples of the proposed method. The results of the provided examples confirm that the method can efficiently identify and quantify the glass liquid front under various video quality conditions as shown in FIG. 6A-FIG. 7B. The liquid front including the glass liquid area of an image or video. Though traditional advanced video and image processing algorithms, similar to those of FIG. 1A and FIG. 1B, fail in low signal-to-noise ratio videos due to their sensitivity to noise, the examples described in FIG. 6A-FIG. 7B reflect accurate results completed without complex computation, requiring substantially no human interaction. The examples reflect productivity in scenarios where large volume of low signal-to-noise videos were analyzed and compared automatically.

FIG. 6A depicts an example image one 616 representing a low signal-to-noise ratio in which the liquid flow 604 speed is fast paced. In this example, after six iterations, the regression coefficient converged to 3.00.

FIG. 6B illustrates another example iterative linear regression result according to an embodiment. FIG. 6B represents an example case in which image two 618 reflects a clean image carrying relatively large parts of useful signal. This useful signal may be the glass liquid area of the image which is visible, thus cropping the image portion containing the most relevant signal. As shown, the regression coefficient converged to 0.52 after only two iterations.

FIG. 7A illustrates yet another example iterative linear regression results according to an embodiment. Image three 714 depicts an example of a heavy and noisy image with a regression coefficient of 1.10 after five iterations.

FIG. 7B illustrates an example iterative linear regression result according to an embodiment. Image four 716 depicts an example of an image having relatively high signal-to-noise ratio, but with little noise. The regression coefficient in this example, is 0.82 after two iterations. Moreover, in these examples, the overall processing time for one video may be less than two minutes considering the longest video recording length was three minutes. Upon completion of the experiments, an improvement in efficiency in time has been made.

Identifying the speed at which glass liquid flows is an efficient method to selecting the appropriate material type. Typically, higher flow speed, such as that of FIG. 6A, represents lower viscosity. Time efficiency is also very important to the screening process. A fast and robust measurement of glass flow using video recordings allows one to efficiently narrow down the type of material to be used.

NOTES & EXAMPLES

Example 1 is a method including capturing a plurality of images from a video, cropping an area of interest from each of the plurality of images, and concatenating the cropped area of interest from each of the plurality of images into a single concatenated image. The method also includes preprocessing the single concatenated image to improve image quality, performing template matching on the preprocessed single concatenated image using a user-defined template to identify a plurality of matching locations, and determining boundary indexes from the plurality of matching locations. The method includes cropping a region from the preprocessed single concatenated image based on the boundary indexes, the cropped region containing a useful signal. This useful signal may be the glass liquid area of the image which is visible, thus cropping the image portion containing the most relevant signal. The method also includes calculating a plurality of intensity gradients in the cropped region, identifying a pixel with a maximum gradient for a plurality of column indexes, and determining an average row index for columns with multiple pixels having the maximum gradient. The method includes performing iterative linear regression on row and column indexes of selected pixels to determine a slope of a line fitting the selected pixels and quantifying a flow speed of glass liquid based on a final slope of the line after substantial convergence of the iterative linear regression.

In Example 2, the method for implementing example 1, wherein the cropped area of interest includes a center column of a container holding the glass liquid.

In Example 3, the method for implementing any one of Examples 1-2, wherein preprocessing includes at least one of sharpening, histogram equalization, segmentation, and thresholding.

In Example 4, the method for implementing any one of Examples 1-3, wherein the user-defined template includes a line, wherein the line indicates a glass liquid region.

In Example 5, the method for implementing any one of Examples 1-4, wherein determining boundary indexes includes determining a smallest row index, a largest row index, and a largest column index of a plurality of matching locations.

In Example 6, the method for implementing any one of Examples 1-5, wherein calculating a plurality of intensity gradients includes calculating column-wise gray level intensity gradients.

In Example 7, the method for implementing any one of Examples 1-6, wherein performing iterative linear regression includes removing outlier pixels in each iteration. Performing iterative linear regression also includes applying an iterative linear regression model with noise removal in each iteration.

In Example 8, the method for implementing any one of Examples 1-7, wherein removing outlier pixels includes removing pixels having an absolute distance from a regression line greater than two standard deviations of distances between each pixel and the regression line.

In Example 9, the method for implementing any one of Examples 1-8, wherein the method quantifies the flow speed in less than 2 minutes.

Example 10 is a system including a computing device comprising one or more processors and at least one memory component. The at least one memory component stores instructions that, when executed by the one or more processors, cause the computing device to access a plurality of images from a video, crop an area of interest from at least one of the plurality of images, and concatenate the cropped area of interest from each of the plurality of images into a single concatenated image. The computing device also reprocesses the single concatenated image to improve image quality, performs template matching on the preprocessed single concatenated image using a user-defined template to identify a plurality of matching locations, and determines boundary indexes from the plurality of matching locations. The computing device crops a region from the preprocessed single concatenated image based on the boundary indexes, the cropped region containing a useful signal. This useful signal may be the glass liquid area of the image which is visible, thus cropping the image portion containing the most relevant signal. The computing device calculates a plurality of intensity gradients in the cropped region, identifies a pixel with a maximum gradient for a plurality of column indexes, and determines an average row index for columns with multiple pixels having the maximum gradient. The computing device also performs iterative linear regression on row and column indexes of selected pixels to determine a slope of a line fitting the selected pixels and quantifies a flow speed of glass liquid based on a final slope of the line after substantial convergence of the iterative linear regression.

In Example 11, the system of any one of Examples 1-10, wherein the cropped area of interest includes a center column of a container holding the glass liquid.

In Example 12, the system of Examples 1-11, wherein preprocessing includes at least one of sharpening, histogram equalization, segmentation, and thresholding.

In Example 13, the system of Examples 1-12, wherein the user-defined template includes a line, wherein the line indicates a glass liquid region.

In Example 14, the system of Examples 1-13, wherein determining boundary indexes includes determining a smallest row index, a largest row index, and a largest column index of a plurality of matching locations.

In Example 15, the system of Examples 1-14, wherein calculating a plurality of intensity gradients includes calculating column-wise gray level intensity gradients.

In Example 16, the system of Examples 1-15, wherein performing iterative linear regression includes removing outlier pixels in each iteration. Performing iterative linear regression also includes applying an iterative linear regression model with noise removal in each iteration.

In Example 17, the system of Examples 1-16, wherein removing outlier pixels comprises removing pixels having an absolute distance from a regression line greater than two standard deviations of distances between each pixel and the regression line.

In Example 18, the system of Examples 1-17, wherein the system quantifies the flow speed in less than 2 minutes.

Example 19 is a system for quantifying glass liquid flow speed from a video. The system includes a computing device comprising a processor and memory, the memory storing instructions that, when executed by the processor, cause the computing device to access a plurality of images from the video, crop a center column from each image, and concatenate the cropped center columns to form a preprocessed concatenated image. The computing device also preprocesses by applying sharpening, histogram equalization, segmentation, and thresholding to the concatenated image to improve image quality and performs template matching on the preprocessed concatenated image using a diagonal line template to identify a plurality of matching locations.

The computing device determines boundary indexes of the matching locations and crops an area from the preprocessed concatenated image based on the boundary indexes, the cropped area containing a signal. The computing device also calculates column-wise gray level intensity gradients in the cropped area, identifies a pixel with a maximum gradient for a plurality of column indexes, and determines an average row index for columns with multiple pixels having the maximum gradient. The computing device applies an iterative linear regression model with noise removal in each iteration on row and column indexes of selected pixels to determine a slope of a line fitting the selected pixels, removes pixels having an absolute distance from a regression line greater than two standard deviations of distances between each pixel and the regression line, and quantifies a flow speed of molten glass based on a final slope of the line after substantial convergence of the iterative linear regression model. The final slope represents the flow speed. The flow speed is inversely proportional to a viscosity of the molten glass, and a difference between slopes of two consecutive linear regressions is less than 0.05.

In Example 20, the system of Examples 1-19, wherein determining boundary indexes comprises determining a smallest row index, a largest row index, and a largest column index of the plurality of matching locations.

Each of these non-limiting examples can stand on its own or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:

capturing a plurality of images from a video;

cropping an area of interest from each of the plurality of images;

concatenating the cropped area of interest from each of the plurality of images into a single concatenated image;

preprocessing the single concatenated image to improve image quality;

performing template matching on the preprocessed single concatenated image using a user-defined template to identify a plurality of matching locations;

determining boundary indexes from the plurality of matching locations;

cropping a region from the preprocessed single concatenated image based on the boundary indexes, the cropped region containing a useful signal;

calculating a plurality of intensity gradients in the cropped region;

identifying a pixel with a maximum gradient for a plurality of column indexes;

determining an average row index for columns with multiple pixels having the maximum gradient;

performing iterative linear regression on row and column indexes of selected pixels to determine a slope of a line fitting the selected pixels with the least error; and quantifying a flow speed of glass liquid based on a final slope of the line after substantial convergence of the iterative linear regression.

2. The method of claim 1, wherein the cropped area of interest comprises a center column of a container holding the glass liquid.

3. The method of claim 1, wherein preprocessing comprises at least one of sharpening, histogram equalization, segmentation, and thresholding.

4. The method of claim 1, wherein the user-defined template comprises a line, wherein the line indicates a glass liquid region.

5. The method of claim 1, wherein determining boundary indexes comprises determining a smallest row index, a largest row index, and a largest column index of a plurality of matching locations.

6. The method of claim 1, wherein calculating a plurality of intensity gradients comprises calculating column-wise gray level intensity gradients.

7. The method of claim 1, wherein performing iterative linear regression comprises:

removing outlier pixels in each iteration; and applying an iterative linear regression model with noise removal in each iteration.

8. The method of claim 1, wherein removing outlier pixels comprises removing pixels having an absolute distance from a regression line greater than two standard deviations of distances between each pixel and the regression line.

9. The method of claim 1, wherein the method quantifies the flow speed in less than 2 minutes.

10. A system comprising:

a computing device comprising one or more processors and at least one memory component, the at least one memory component storing instructions that, when executed by the one or more processors, cause the computing device to:

access a plurality of images from a video;

crop an area of interest from at least one of the plurality of images;

concatenate the cropped area of interest from each of the plurality of images into a single concatenated image;

preprocess the single concatenated image to improve image quality;

perform template matching on the preprocessed single concatenated image using a user-defined template to identify a plurality of matching locations;

determine boundary indexes from the plurality of matching locations;

crop a region from the preprocessed single concatenated image based on the boundary indexes, the cropped region containing a useful signal;

calculate a plurality of intensity gradients in the cropped region;

identify a pixel with a maximum gradient for a plurality of column indexes;

determine an average row index for columns with multiple pixels having the maximum gradient;

perform iterative linear regression on row and column indexes of selected pixels to determine a slope of a line fitting the selected pixels; and quantify a flow speed of glass liquid based on a final slope of the line after substantial convergence of the iterative linear regression.

11. The system of claim 10, wherein the cropped area of interest comprises a center column of a container holding the glass liquid.

12. The system of claim 10, wherein preprocessing comprises at least one of sharpening, histogram equalization, segmentation, and thresholding.

13. The system of claim 10, wherein the user-defined template comprises a line, wherein the line indicates a glass liquid region.

14. The system of claim 10, wherein determining boundary indexes comprises determining a smallest row index, a largest row index, and a largest column index of a plurality of matching locations.

15. The system of claim 10, wherein calculating a plurality of intensity gradients comprises calculating column-wise gray level intensity gradients.

16. The system of claim 10, wherein performing iterative linear regression comprises:

removing outlier pixels in each iteration; and applying an iterative linear regression model with noise removal in each iteration.

17. The system of claim 10, wherein removing outlier pixels comprises removing pixels having an absolute distance from a regression line greater than two standard deviations of distances between each pixel and the regression line.

18. The system of claim 10, wherein the system quantifies the flow speed in less than 2 minutes.

19. A system for quantifying glass liquid flow speed from a video, the system comprising:

a computing device comprising a processor and memory, the memory storing instructions that, when executed by the processor, cause the computing device to:

access a plurality of images from the video;

crop a center column from each image;

concatenate the cropped center columns to form a preprocessed concatenated image;

preprocess by applying sharpening, histogram equalization, segmentation, and thresholding to the concatenated image to improve image quality;

perform template matching on the preprocessed concatenated image using a diagonal line template to identify a plurality of matching locations;

determine boundary indexes of the matching locations;

crop an area from the preprocessed concatenated image based on the boundary indexes, the cropped area containing a signal;

calculate column-wise gray level intensity gradients in the cropped area;

identify a pixel with a maximum gradient for a plurality of column indexes;

determine an average row index for columns with multiple pixels having the maximum gradient;

apply an iterative linear regression model with noise removal in each iteration on row and column indexes of selected pixels to determine a slope of a line fitting the selected pixels;

remove pixels having an absolute distance from a regression line greater than two standard deviations of distances between each pixel and the regression line; and quantify a flow speed of molten glass based on a final slope of the line after substantial convergence of the iterative linear regression model, wherein the final slope represents the flow speed, the flow speed is inversely proportional to a viscosity of the molten glass, and a difference between slopes of two consecutive linear regressions is less than 0.05.

20. The system of claim 19, wherein determining boundary indexes comprises determining a smallest row index, a largest row index, and a largest column index of the plurality of matching locations.

* * * * *